(12) United States Patent
Lin et al.

(10) Patent No.: US 8,630,022 B2
(45) Date of Patent: Jan. 14, 2014

(54) METHOD OF IDENTIFYING A TARGET SIMPLEX

(75) Inventors: I-Jong Lin, Half Moon Bay, CA (US);
Miheer Bhachech, Palo Alto, CA (US);
Jeffrey M. DiCarlo, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 572 days.

(21) Appl. No.: 12/992,728

(22) PCT Filed: May 31, 2008

(86) PCT No.: PCT/US2008/065456
§ 371 (c)(1),
(2), (4) Date: Nov. 15, 2010

(87) PCT Pub. No.: WO2009/145793
PCT Pub. Date: Dec. 3, 2009

(65) Prior Publication Data
US 2011/0069336 A1    Mar. 24, 2011

(51) Int. Cl.
*H04N 1/60* (2006.01)

(52) U.S. Cl.
USPC ........... 358/1.9; 358/1.15; 358/518; 345/501; 345/591

(58) Field of Classification Search
USPC ......... 358/1.9, 1.15, 3.01, 518; 345/501, 591; 382/162
See application file for complete search history.

(56) References Cited

U.S. PATENT DOCUMENTS

| | | | |
|---|---|---|---|
| 5,878,195 A * | 3/1999 | Mahy | 358/1.9 |
| 2004/0161258 A1 * | 8/2004 | Hren et al. | 399/82 |
| 2005/0254073 A1 | 11/2005 | Braun et al. | |
| 2008/0170254 A1 * | 7/2008 | Shah | 358/1.15 |
| 2010/0253698 A1 * | 10/2010 | Chang et al. | 345/591 |

FOREIGN PATENT DOCUMENTS

| WO | WO-2006081253 A1 | 8/2006 |
| WO | WO-2007099091 A1 | 9/2007 |

OTHER PUBLICATIONS

Peter Hemingway, "n-Simplex Interpolation", Client and Media System Laboratory, HP Laboratories Bristol, Nov. 20, 2002.

* cited by examiner

*Primary Examiner* — Allen H Nguyen

(57) ABSTRACT

A method and system identify a target simplex (T7) and interpolate inputs of points (214, 216, 218) of the target simplex (T7) to identify a combination of inputs that achieves a target result (TR).

15 Claims, 6 Drawing Sheets

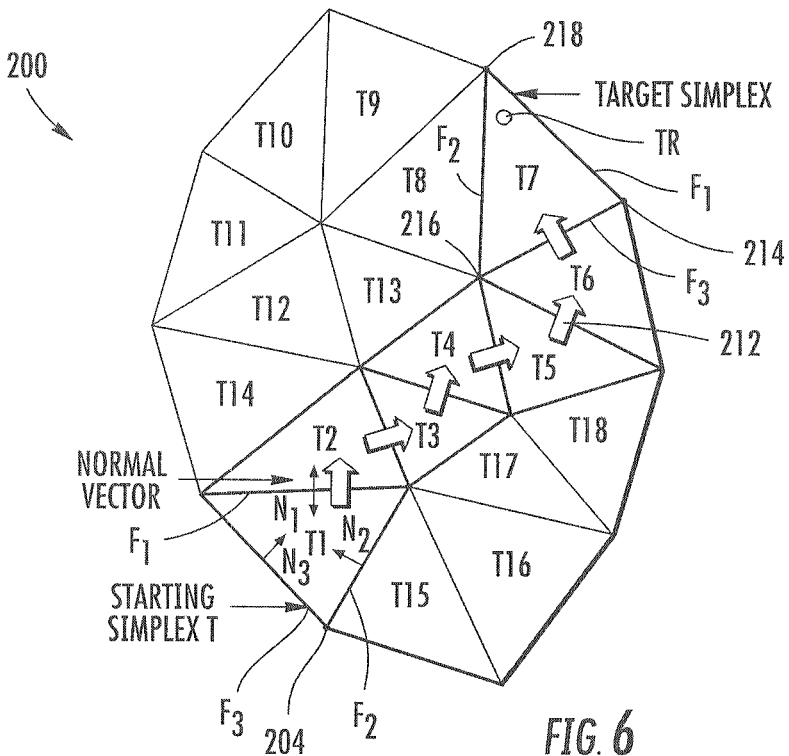
FIG. 6
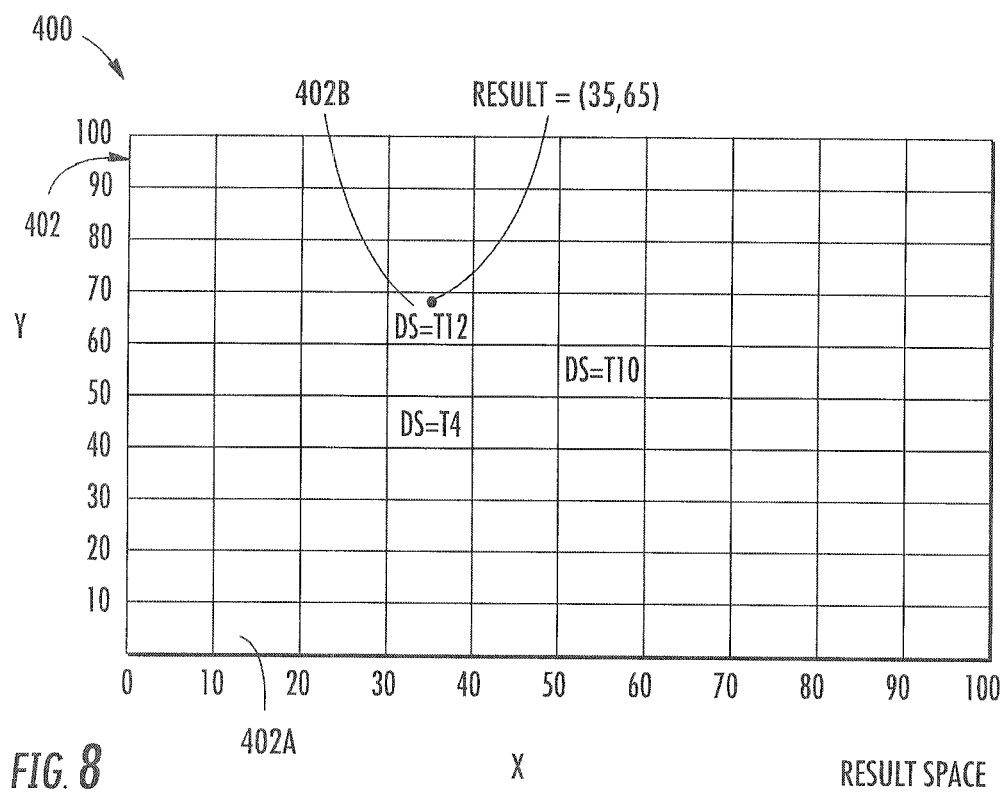
FIG. 8        X        RESULT SPACE

METHOD OF IDENTIFYING A TARGET SIMPLEX

BACKGROUND

In many applications, different combinations of inputs may produce different results. The inputs may be non-linearly related to the results. As a result, interpolated look-up tables are sometimes generated for the results. Values in look up tables are interpolated a second time to identify combinations of inputs for results that lie between values contained in the look-up table. Although the calculation of this look up table simplifies computation, these two successive interpolations introduce error.

BRIEF DESCRIPTION OF THE DRAWINGS

FIG. 6 is a schematic representation of an array of two-dimensional simplices, illustrating a computational walk-through of the simplices to a target simplex according to the method of FIG. 4 according to an example embodiment.

FIG. 8 is a schematic representation of device independent color space partitioned into sections per the method of FIG. 7 according to an example embodiment.

DETAILED DESCRIPTION OF THE EXAMPLE EMBODIMENTS

FIGS. 1-5 illustrate a process or method for identifying a set of inputs to achieve a desired result. FIGS. 1-5 illustrate a method for identifying a set of inputs for a particular device to achieve a device independent result. In the example illustrated, FIGS. 1-5 illustrate a method for identifying a set of color inputs in a first color space for achieving a desired result color in a second color space. In the example illustrated, FIGS. 1-5 illustrate a method for identifying a set of color printing material inputs in a device dependent subtractive color space for achieving a result color in a device independent color space. As will be described hereafter, the method described with respect to FIGS. 1-5 identifies inputs for a desired result with a single interpolation by identifying a simplex of inputs that may be used to interpolate the desired result.

Figure 1:
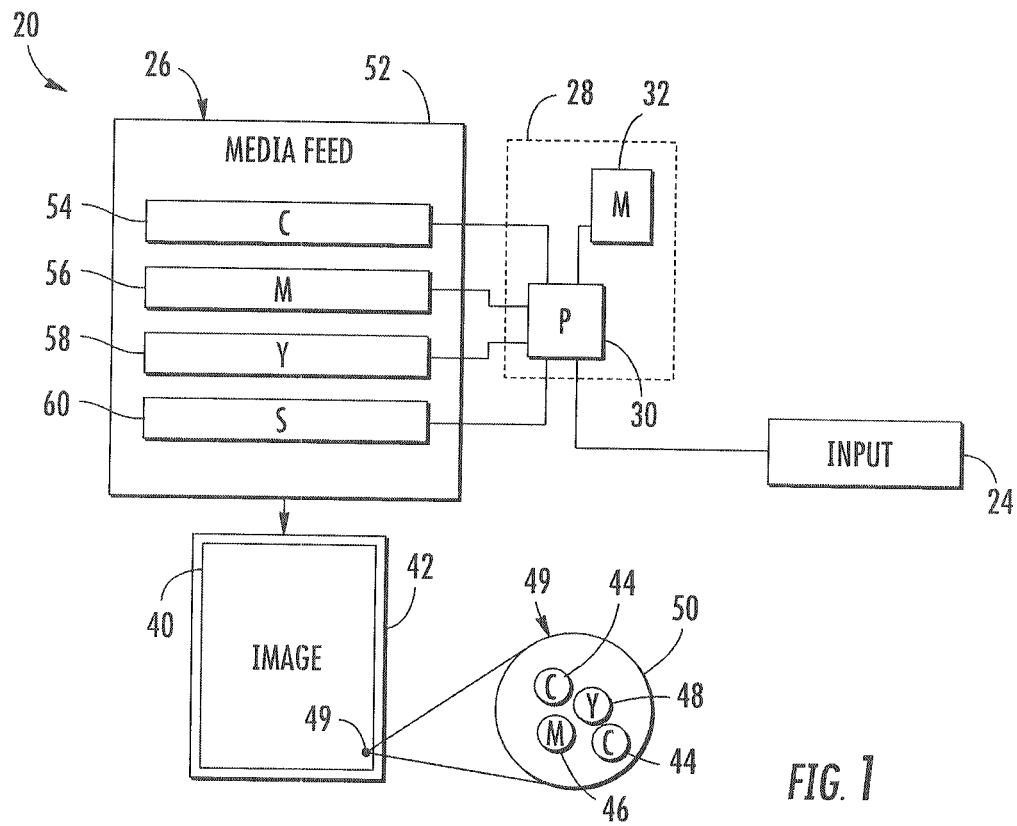
FIG. 1 is a schematic diagram of a printing system according to an example embodiment.

FIG. 1 schematically illustrates a printing system according to an example embodiment. As noted above, printing system 20 is configured to identify a set of color printing material inputs in a subtractive color space for achieving a result color in a device independent color space. As will be described hereafter, printing system 20 identifies inputs for a desired result with a single interpolation by identifying a simplex of inputs that may be used to interpolate the desired result. Printing system 20 generally includes input 24, printer 26 and controller 28 which includes processor 30 and memory 32.

Input 24 comprises one or more devices configured to receive and transmit instructions, commands or data to controller 28 for use in generating control signals for directing the operation of printer 26. Examples of inputs include, but are not limited to, touchpad, keyboards, touchscreens, mouse, stylus, microphone and speech recognition software, floppy drives, disk drives, digital memory card readers or connections to other devices, networks or the Internet. In one embodiment, the actual image data may be provided via input 24. In another embodiment, input 24 may facilitate selection or modification of image data already contained in memory 32.

Printer 26 comprises a device configured to form an image 40 upon print medium 42. In the example illustrated, printer 26 is configured to form a color image 40 upon medium 42 using various color inputs. In the example illustrated, printer 26 forms image 40 using three subtractive color inputs, cyan 44, magenta 46 and yellow 48. In other embodiment, image 40 may be provided by additional or alternative color inputs. For example, in other embodiments, printer 26 may include a dye based black or a pigment-based black color input. In other embodiments, printer 26 may additionally include a light cyan, a light yellow or a light magenta color input. In yet other embodiments, printer 26 may include other combinations of color inputs as well. As shown by the enlarged portion 50 of FIG. 1, image 40 is formed from a multitude of color inputs 44, 46 and 48, which through techniques such as half toning, present a visible pixel 49 of image 40.

According to one embodiment, printer 26 comprises a drop-on-demand inkjet printer including media feed 52, print devices 54, 56 and 58 and sensors 60. Media feed 52 transports media relative to print devices 54-58. In one embodiment, media feed 52 comprises a combination of one or more of belts, rollers, conveyors, and one or more drums and the like by which sheets or webs of media is transported across relative to print devices 54-58. In other embodiments, media feed 52 may have other configurations or may be omitted where adequate coverage of the print medium 42 is achieved without movement of print medium 42.

Print devices 54, 56 and 58 comprise devices configured to selectively deposit cyan, magenta and yellow inks upon medium 42 to form image 40. As noted above, in other embodiments, printer 26 may include additional or alternative print devices for depositing additional or alternative colors of ink. In the example illustrated, print devices 54, 56 and 58 comprise page-wide-array print devices which are substantially stationary during printing and which extend across a majority of medium 42. In other embodiments, print devices 54, 56 and 58 may be moved or scanned relative to and across medium 42 by a carriage (not shown).

In another embodiment, printer 26 may comprise an electrophotographic or electrostatic printer, wherein dry or liquid toner is deposited upon a carrier based upon electrostatic image formed upon the carrier. The carrier is then brought directly into contact with medium 42 or transfers the toner to an intermediate transfer member which is brought into contact with medium 42. Different combinations of colors of toner, such as cyan, magenta and yellow, form the image 40 upon medium 42.

In still other embodiments, printer 26 may be configured to deposit, form or activate different combinations of colors, including different percentages of colors, so as to form different colored pixels upon medium 42 to form image 40. For example, in other embodiments, medium 42 may already carry different colors, wherein different portions of medium 42 may be selectively activated by printer 26 to form the different color inputs that produce, in combination, the desired colored pixels of the image 40. For example, medium 42 may comprise a multilayered structure, such as a disk, having layers of different color inputs or different color filters, wherein different layers are selectively activated by a laser or other treatment, to expose selected layers provide a label or color image upon the disk. In such an embodiment, print devices 54, 56 and 58 may be replaced with one or more controllable lasers.

Sensor 60 comprises a device configured to sense or detect the actual results achieved with various combinations of inputs. In the example illustrated, sensor 60 comprises a color sensor configured to sense the actual resulting color (device independent color) achieved by different combinations of color inputs. In one embodiment, sensor 60 extends across and spans a dimension of media 42. In another embodiment, sensor 60 may be scanned or moved across media 42. As will be described hereafter, data from sensor 60 is used by controller 28 to determine combinations of color inputs for achieving a color of a pixel in an image to be printed. In other embodiments where such data is already known or provided to controller 28, sensor 60 may be omitted.

Controller 28 comprise one or more processing units configured to generate control signals directing printer 26 to form image 40 based upon image data provided by input 24 or contained in memory 32. For purposes of this application, the term "processing unit" shall mean a presently developed or future developed processing unit that executes sequences of instructions contained in a memory, such as memory 32. Execution of the sequences of instructions causes the processing unit to perform steps such as generating control signals. Memory 32 may comprise a random access memory (RAM), a read only memory (ROM), a mass storage device, or some other persistent storage. In other embodiments, hard wired circuitry may be used in place of or in combination with software instructions to implement the functions described. For example, controller 28 may be embodied as part of one or more application-specific integrated circuits (ASICs). In one embodiment, at least portions of controller 28 may be embodied as part of a graphics processing unit (GPU). Unless otherwise specifically noted, the controller is not limited to any specific combination of hardware circuitry and software, nor to any particular source for the instructions executed by the processing unit.

In many instances, image data contained in memory 32 or provided to controller 28 by input 24 defines the colors of the image in a device independent color space. Examples of device independent color space include, but are not limited to, Lab, XYZ, spectral reflectance and spectral power distributions, sRGB, and AdobeRGB. However, the actual colors of image 40 are device dependent. For example, the actual colors of the pixels of image 40 are dependent upon the color characteristics of the color inputs of printer 26 as well as the characteristics of medium 42. For example, one printer 26 may utilize cyan, magenta and yellow inks or toners. Another printer may use cyan, magenta, yellow and black inks or toners. Yet another printer may use dark cyan, light cyan, dark magenta, light magenta, dark yellow and light yellow inks or toners. Each of such printers may also have a UV coating or veneer that may affect the color. Different types of inks/toners or different qualities of ink/toner may also impact the actual color of the pixels of image 40. As a result, controller 28 determines the color input combination (their spacings, locations, quantities or percentages) that best achieve the device independent color specified in the image data and generates control signals which cause printer 26 to use the determined color input combinations.

Figure 3A:
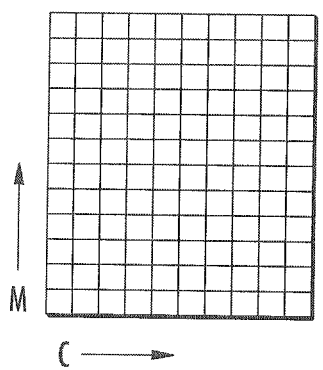
FIGS. 3A-3C are top plan views of printed combinations of inputs for sensing by the printing system of FIG. 1 according to an example embodiment.
Figure 3B:
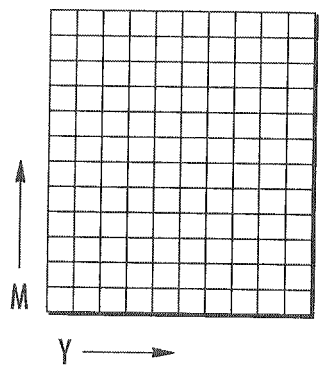
Figure 3C:
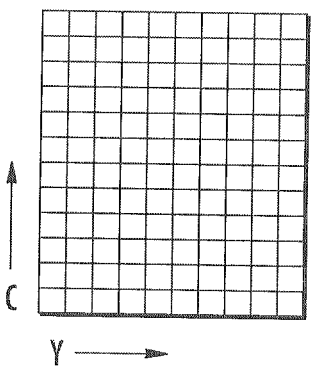
Figure 2:
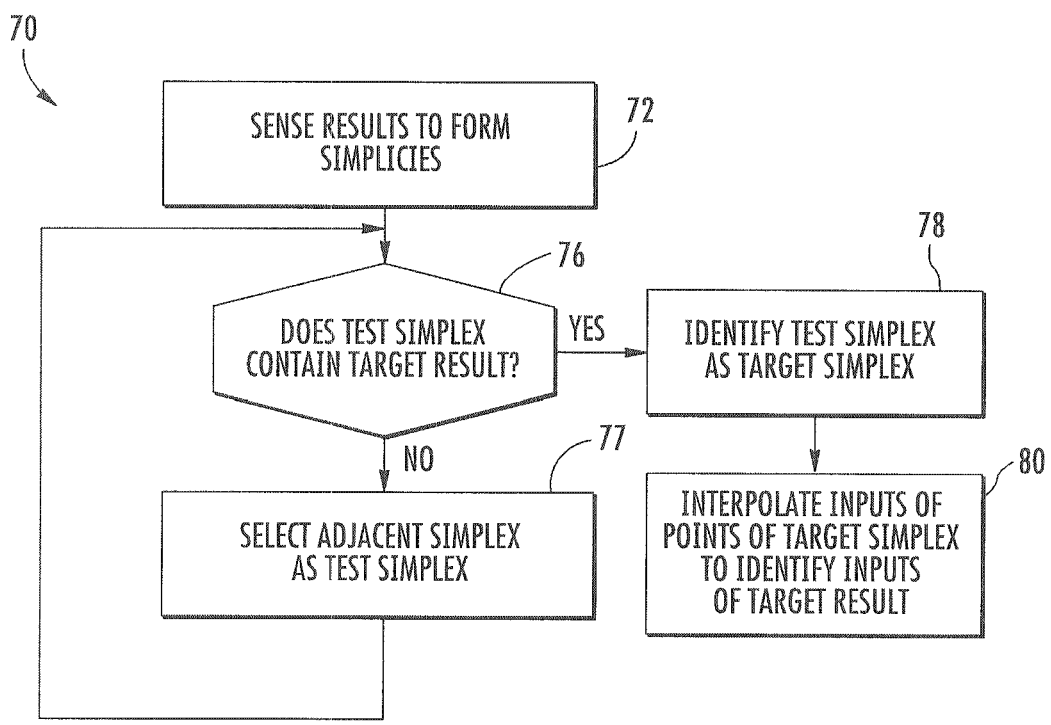
FIG. 2 is a flow diagram of a method for identifying a combination of inputs that achieves a target result according to an example embodiment.

FIG. 2 illustrates one example method 70 by which controller 28 determines or identifies what particular combinations of color inputs 44-48 for a device best achieve a desired resulting pixel color. As indicated by step 72 in FIG. 2 and in combination with FIGS. 3A-3C, controller 28 generates control signals directing printer 26 to print various combinations of color inputs (such as cyan, magenta and yellow) onto media 42. The results of these printed combinations are then sensed by sensor 60 which provides the results to controller 28 which stores the results in memory 32. As shown by FIG. 3A, controller 28 directs printer 26 to print various combinations of cyan and magenta colors while holding yellow constant. As shown by FIG. 3B, controller 28 directs printer 26 to print various combinations of magenta and yellow while holding cyan constant. As shown by FIG. 3C, controller 28 directs printer 26 to print various combinations of cyan and yellow inks holding magenta constant. Each of the sheets of results shown in FIGS. 3A-3C is sensed by sensor 60. In some embodiments, the sensing of different combinations of inputs and the recording of such results in memory 32 may be performed when ink or toner supplies to printer 26 are exchanged or replaced, when printer 26 is initially formatted or set up or when printer 26 is configured at a factory. In other embodiments, this process may be performed using a sensor not associated with printer 26. In some embodiments, this data-gathering may be performed for a single test printer, wherein the data gathered is utilized for multiple other printers of a similar model, make or characteristic or for printers that print with same ink or toner.

Figure 4:
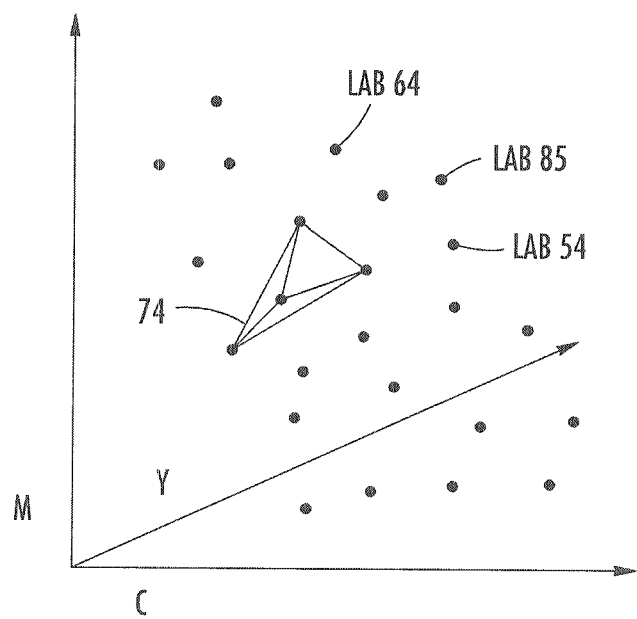
FIG. 4 is a perspective view of a device dependent color space including device independent values sensed from the printed combinations of inputs of FIGS. 3A-3C and an example 3-dimensional simplex form by such values according to an example embodiment.

FIG. 4 illustrates an example of data gathered by controller 28 from the sheet shown in FIGS. 3A-3B. As shown, each value sensed by sensor 60 comprises a device independent value, such as a L*a*b value. Each data point exists in a n-dimensional space, wherein n corresponds to the number of inputs which results in the device independent value. In the example illustrated, the resulting device independent value (L*a*b value) is formed based upon three inputs, cyan, magenta and yellow. Thus, each value or point exists in a three-dimensional space. In embodiments where a greater or fewer of such inputs result in the device independent result, the points may exist in a larger or smaller dimensional space.

As further shown by FIG. 4, each of the points may be grouped into simplices formed from n+1 points, where n is the number of inputs. The simplices define an area (where n=2), a volume (where n=3) or content (where n>3). In defining such simplices, processor 30 of controller 28 applies the following rules: (1) there is a path for any one simplex A to any other simplex B such that every point on the path AB lies within the collective coverage of all the simplices; (2) no simplex in the coverage intersects with one another; and (3) if any simplex A is defined by a point that also defines simplex B, the intersection of points defining simples A and points defining simplex B have exactly n points. Stated another way, the simplices must form a valid simplicial complex.

FIG. 4 illustrates one simplex 74 defined by three such points sensed by sensor 60 from the sheet shown in FIGS. 3A-3B. Controller 28 forms multiple simplices from the gathered data points. As will be described hereafter, controller 28 identifies a target simplex from all the simplices and interpolate those input values that correspond to the points of the target simplex to identify a desired combination of input values to achieve a particular device independent result that may not have been sensed by sensor 60 but which is to be formed on medium 42 as part of image 40 (shown in FIG. 1).

As indicated by steps 76-78 in FIG. 2, controller 28 identifies which of the array of simplices contain a target result. The target result is a device independent color which is to be printed using a device dependent inputs 54-58. In particular, as indicated by step 76 and 77, controller 28 sequentially tests a series of consecutive an adjacent simplices until a simplex containing the target result is found. As indicated by step 78, the particular test simplex that is tested and that is found to contain the target result is identified as the target simplex.

As indicated by step 80 in FIG. 2, once the target simplex has been identified by controller 28, controller 28 then interpolates the color inputs of the points of the target simplex to identify the combination of color inputs (such as inputs 54-58 in the example) that achieve the target result. For example, each point of the target simplex having a value in device independent color space has corresponding device dependent color inputs 54-58. Each point of the target simplex has a value in device independent color space that was sensed by sensor 60. The device dependent color inputs 54-58 comprises those known amounts of each of inputs 54-58 that produced the image portion that was sensed by sensor 60. Based upon the relative positioning or distance between the target result within the target simplex (which is in device independent color space) and each of the vertices or points of the target simplex (which are also in device independent color space), controller 28 calculates and assigns a barycentric coordinate or coefficient to each of the points. In one embodiment, the coefficients are between 0 and 1 and add up to a sum of one. A point of the target simplex that is very close to the target result will have coefficient closer to one while a point or vertex of the target simplex that is very distant the target result will have a coefficient closer to zero. Controller 28 uses the coefficients assigned to the points and the actual values of the inputs associated with each point of the target simplex in its interpolation of the combination of inputs 54-56 that produce the target result.

Figure 5:
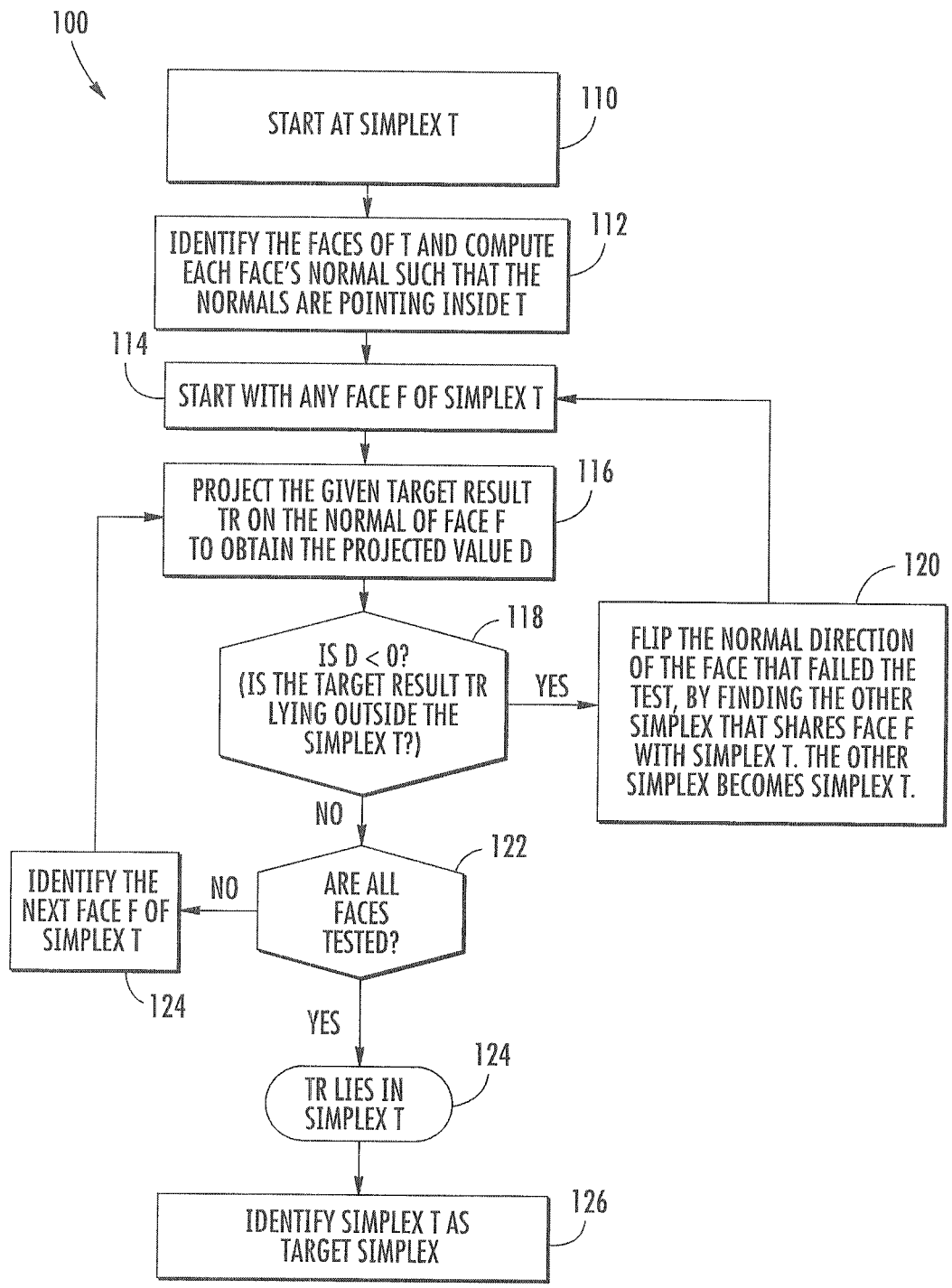
FIG. 5 is a flow diagram of a method for identifying a target simplex containing a target result and for interpolating a combination of inputs for the target result from the target simplex according to an example embodiment.

FIGS. 5-6 illustrate one example method 100 for identifying the target simplex. FIG. 5 is a flow diagram of method 100. FIG. 6 is a diagram of an example array 200 of simplices T1-T18 (collectively referred to as simplices T) in a two dimensional space; a simplex in two dimensional space is a triangle. For ease of illustration and discussion, method 100 is described with respect to an array 200 of simplices T in two dimensional space. In other words, each of simplices T is formed from three points, rather than the simplices shown in FIG. 4 which are defined by four points. Each point of the simplex T comprises a device independent result or value as sensed by sensor and corresponds to two device dependent inputs. Method 100 may similarly be used to identify a particular one of an array of simplices in three-dimensional space (such as shown in FIG. 3) or a space having a greater number of dimensions (four or more dimensions where four or more inputs produce a sense device independent result). For ease of illustration, only 18 simplices are shown. In other embodiments, depending upon the number of results sensed by sensor 60 or provided to controller 28, array 200 may have greater or fewer of such simplices.

As indicated at step 110 of FIG. 5 and illustrated in FIG. 6, controller 28 (shown in FIG. 1) identifies an initial or starting simplex for testing or evaluation. In the example illustrated, controller 28 randomly identifies one of simplex T as a starting simplex T. In the example illustrated, controller 28 randomly selects simplex T1 as the starting simplex T. In other embodiments, controller 28 may identify any other one of simplices T2-T18 as a starting simplex T. As will be described hereafter, in other embodiments, controller 28 may select one of simplices T for initial evaluation and testing other than in a random manner.

In steps 112-118, controller 28 determines whether the device independent target result TR (the Lab color value for pixel to be printed in the example) lies within the simplex T being evaluated by determining whether the target result TR lies on a same side of each of the faces of the simplex T as other points of the simplex T. If controller 28 determines that the target result TR lies on the same side of each face of the simplex as other points of the simplex, controller 28 concludes that the target result TR lies within the simplex being evaluated. In other words, the simplex being evaluated is the target simplex. However, once controller 28 determines that the target result is not on the same side of a face being evaluated as other points of the simplex T, controller 28 concludes that the target result is not in the simplex being evaluated and moves on to test another simplex adjacent to and on an opposite side of the face just evaluated.

As indicated at step 112 of FIG. 5, controller 28 mathematically calculates the faces of the current simplex T being evaluated. In the example illustrated in which each simplex T is two-dimensional, each face comprises a line. In cases where a simplex has three or more dimensions, each face comprises a plane. Controller 28 further computes or identifies the normals $N_1$, $N_2$ and $N_3$ of each of the faces, wherein each of the normals $N_1$, $N_2$ and $N_3$ points inside or towards the interior of the associated simplex T. Although method 100 is described as calculating the normals for each of the faces of the simplex being tested, in other embodiments, controller 28 may calculate only the normal for the particular face of the simplex being evaluated. If the particular face being evaluated fails the test, there is no need to calculate the normals for the other faces, reducing processing power and processing time.

As indicated at step 114 in FIG. 5, controller 28 begins its analysis of the current simplex being tested by selecting one of the faces of the simplex T for evaluation. In the example illustrated, face F1 is randomly selected as the face of simplex T1 to be evaluated. In other embodiments, other faces, such as F2 or F3 of simplex T1 may be initially evaluated. In other embodiments, the particular face of simplex T for evaluation may be chosen by controller 28 in a non-random manner using one or more particular processes or algorithms.

As indicated by step 116 in FIG. 5, the device independent target result TR (the Lab color value for pixel to be printed in the example) is projected onto the normal of the particular face being evaluated. In the example illustrated in FIG. 5, the target result TR is projected onto normal N1 of face F1 to obtain a projected value D. In particular, the projected value D will be less than zero when the target result TR lies on an opposite side of the face being evaluated as compared to other points of the simplex. In the particular example illustrated in FIG. 1, the target result TR has a projected value D less than zero (the projected target result TR is not on the same side of face F1 as other points of simplex T1, such as point 204). As a result, controller 28 proceeds to step 120 in FIG. 4.

As indicated in step 120 in FIG. 5, controller 28 identifies another one of simplices T in array 200 that shares the same face F, i.e. contains all the points of face F, just evaluated for the previous simplex T. In particular, controller 28 chooses the next simplex as an adjacent simplex that is in the normal direction of the face that failed the test to identify an adjacent simplex for testing (the "test simplex"). In other words, controller 28 "flips" the normal direction of the face that failed the test to identify an adjacent simplex for testing. In the example illustrated in FIG. 6, controller 28 finds another simplex that 1) contains all the points in F1 (the face that just failed the test), and 2) is not the previous simplex, which, in this case, results in simplex T2 being chosen as the next simplex for testing.

As indicated by the flow diagram of FIG. 5, steps 114, 116, 118 and 120 are repeated until the target result TR is found to lie within the simplex being evaluated. In other words, the steps are repeated until the target result TR is found to lie on the same side of each and every face of the test simplex as other points of the test simplex. As shown in FIG. 6, this repeated sequence of testing a simplex and moving onto the next adjacent simplex if the tested simplex fails results in controller 28 effectively computationally "walking" (applying a computational algorithm to data) through a series or sequence of consecutive and adjacent simplices as indicated by arrows 212. In the example illustrated, controller 28 tests each of simplices T1, T2, T3, T4, T5, T6 before reaching simplex T7.

In other scenarios, controller 28 may computationally "walk" through different series or sequences of consecutive and adjacent simplices before reaching simplex T7. For example, if controller 28 had alternatively initially tested face F2 of the starting simplex T1 instead of face F1, controller 28 may have alternatively computationally walked-through simplices T1, T15, T16, T17, T18, T5 and T6 before reaching simplex T7. Controller 28 may alternatively "walk" through any one of a variety of different sequences of simplices T before eventually reaching simplex T7. The particular computational path of simplices followed will depend upon the particular face of each of the tested simplices that happens to be evaluated and is the ordered series of simplices that were evaluated.

As shown by FIG. 6, in the example illustrated, the target result TR lies within simplex T7. In other words, the target result TR lies on the same side of each face of a simplex T7 as other point of simplex T7 that is not contained in respective face. Following steps 116 and 118, controller 28 will determine that the target result TR, projected onto the normal of the face F1 of simplex T7 (the first face of simplex T7 randomly chosen for evaluation) has a projected value D greater than zero. Accordingly, controller 28 moves to step 122 of method 100 shown in FIG. 4. Since all of the faces of the simplex T7 have not yet been evaluated or tested, controller 28 proceeds to step 124 and repeat steps 116 and 118 with respect to a different face, such as face F2 of simplex T7 (the second face of simplex T7 randomly chosen from the remaining un-tested faces for evaluation). Once again, controller 28 will computationally determine that the target result TR also has a projected value D greater than zero. Following steps 122 and 124, controller 28 repeats steps 116 and 118 for the third and final face F3 of simplex T7. Because the target result TR lies within simplex T7, face F3 will also pass the test. The projected value D for face F3 will also be greater than zero.

As indicated by step 124, having tested and passed all the faces of simplex T7, controller 28 computationally determines that the target result lies within the particular simplex T under evaluation, simplex T7. As indicated by step 126 (which correspond to step 78 in FIG. 2), simplex T7 is identified as a target simplex.

Once simplex T7 has been identified as a target simplex, controller 28 interpolate inputs of the points of simplex T7 (per step 80 in FIG. 2) to identify those inputs that will produce the target result TR. For example, in the example shown in FIG. 6 in which the target result TR is contained within a two-dimensional simplex T7 having points 214, 216 and 218 with each point having a value resulting from a particular combination of two inputs, controller 28 utilizes quadrahedral interpolation to determine the input values that will achieve the target result TR.

In embodiments where the sensed values are the result of various combinations of three inputs, such as the combination of the cyan, magenta and yellow inputs described above with respect to FIGS. 1-3, each of the simplices will have four points and four faces as shown in FIG. 4. For the simplex being evaluated, the target result must be tested against each of the four faces of the simplex. Once a target three-dimensional simplex has been identified, controller 28 applies tetrahedral interpolation to the four points and the three input values associated with each point to determine the input values that will achieve the target result TR.

In other embodiments, for an n-dimensional simplex to be identified as the target simplex containing the target result, each of the n+1 faces must pass the test. In other words, the target result must be found to lie on the same side of each of the n+1 faces as other points of the n-dimensional simplex. Depending upon the number of inputs and the corresponding number of points n of the simplices, controller 28 will perform n+1 hedral interpolation (i.e. where n=4, applying a tetrahedral interpolation) to identify the combination of inputs that achieves the target result TR. In some embodiments, selected simplices may have associated properties such that a different mathematical function (not necessarily n+1 hedral interpolation) may be applied with the points along with the properties. For example, with respect to printers, selected simplices may be marked or defined as "out-of-gamaut". In such instance, a different type of interpolation or other mathematical function may be applied to identify the combination of inputs that achieves the target result TR or a result acceptably close to TR.

According to one embodiment, the target result is the actual device independent color of the pixel to be printed by printer 26 onto medium 42 (shown in FIG. 1). The interpolated inputs are the actual inputs (50, FIG. 1) applied by printer 26 to form the pixel of image 40. In such an embodiment, controller 28 carries out method 100, according to a set of computer or program readable instructions contained on a computer program readable memory, for each pixel of image 40. In each instance, controller 28 begins the identification of the target simplex by randomly selecting one of the simplices T for initial testing. In other embodiments, proactive methods may be applied by controller 28 in its selection of the initial simplex T for testing to potentially reduce the processing power and processing time consumed during the identification of the target simplex.

Figure 7:
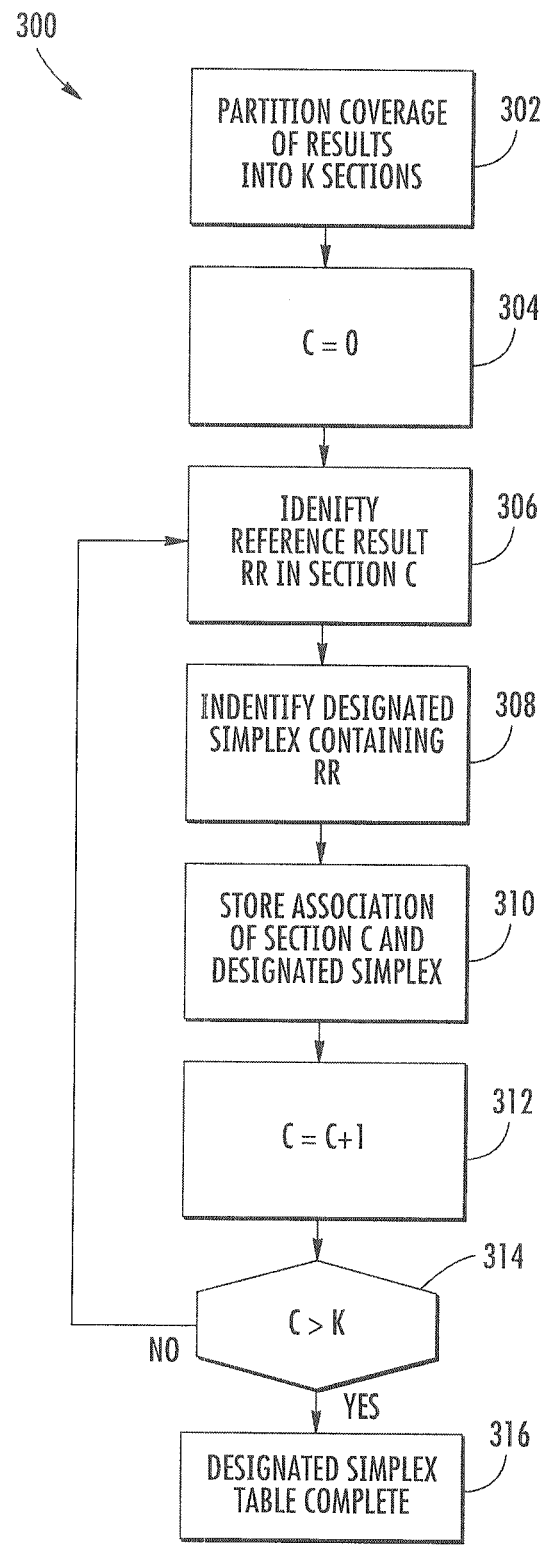
FIG. 7 is a flow diagram of a method for forming a starting simplex table according to an example embodiment.

FIGS. 7 and 8 illustrate one example method 300 (shown in FIG. 7) for generating a look-up table or other recording of associations for subsequent use by controller 28 in selecting a particular simplex T as the initial simplex T to be tested. The generated look-up table contains simplices which are assigned or designated as starting simplices for particular ranges of target results. For example, when controller 28 is trying to identify a target simplex for a first target result within a first range of values, the look-up table may indicate a first simplex as the initial test simplex. When controller 28 is trying to identify a target simplex for a second target result within a second range of values, the look-up table may indicate a second different simplex as the initial test simplex. Controller 28 consults the look-up table to determine which simplex should be used as an initial test simplex based upon the target result.

The look-up table is formed using the same walk-through method shown and described above with respect to FIGS. 5 and 6. The associations recorded as a result of method 300 provide controller 28 with a closer starting point for its computational "walk," reducing processing power and processing time consumed during the identification of the target simplex for each pixel that is to be printed.

As indicated by step 302 in FIG. 7, the total device independent result space (the coverage of results) is partitioned into sections. FIG. 7 illustrates one example two-dimensional device independent result space 400 partitioned into a 10 section by 10 section grid having 100 sections 402. Each section contains results which have locations in space based upon their device independent inputs. The device independent space has a dimensionality equal to the number of device independent inputs. In the example illustrated in FIG. 8, the space is two-dimensional. In another embodiment, such as a device independent color space having device independent inputs x, y, z, the device independent color space is three-dimensional (a cube) having sections in three dimensions. Each section encompasses a range of device independent inputs. For examples, section 402A in FIG. 7 encompasses result values having an x input of between 10 and 20 and a y input of between 0 and 10.

As shown by FIG. 7, Steps 306-310 are repeated for each of the defined sections 402. The counter C is merely a counter indicating that steps 306-310 are repeated for an each and every one of the total K sections of the device independent space. As indicated by step 306, for each section 402, controller 28 selects a reference result contained within the particular section. According to one embodiment, controller 28 identifies a reference result centrally located within the particular section. In the example shown in FIG. 8, controller 28 identifies a reference result having coordinates x=35 and y=65 for section 402B. Because controller 28 uses a reference result that is centrally located within the section, the simplex associated with the section for use as a starting simplex will more likely be closer to the target simplex. In other embodiments, controller 28 may utilize other reference results for each section.

As indicated by step 308, for each section 402, controller 28 identifies a designated simplex containing the reference result. In the example illustrated, the designated simplex is identified by controller 28 using the same method described above with respect to FIGS. 5 and 6. Rather than the target result comprising a particular device independent color for a pixel to be printed by printer 26, the target result is instead a reference result comprising a device independent color associated with one of sections 402 by which a starting simplex is assigned to or designated for the particular section 402. In the example shown in FIG. 8, simplex T12 is identified as the designated simplex containing the reference result TR having an x value of 35 and a y value of 65.

In identifying the designated simplex to be associated with the particular section containing the reference result, controller 28 once again randomly selects a starting simplex T and determines whether the reference result (the result centrally located within section 402B in the example) is contained within a randomly selected starting simplex T. If the reference result is not contained within the simplex T being tested, controller 28 proceeds by testing an adjacent simplex and repeating the process until the target designated simplex is identified.

As indicated by step 310, once a target designated simplex containing the reference result is identified, the designated simplex is assigned to a particular section 402. This process is repeated for each of sections 402 to form a table or other record including a designated simplex assigned to each section 402. This completes the designated simplex table as indicated by step 316.

Once the designated simplex table is completed, controller 28 uses the table in determining which simplex should serve as a starting simplex when subsequently identifying a target simplex that contains a target result comprising the actual device color to be printed by printer 26 on medium 42. In particular, at step 110 in FIG. 5, controller 28 first determines which of sections 402 contained the target result which is to be printed. In the example illustrated in FIG. 8, if the target result to be printed has a device independent value with a device independent x-input of 38 and a device independent y input of 63, controller 28 identifies section 402B in result space 400 as the section containing the target result TR to be printed. Consulting the previously formed designated simplex table, controller 28 utilizes simplex T12 (the simplex assigned to section 402B) as a starting simplex in step 110 of method 100. For any target result having an x input value of between 30 and 40 and a y input value of between 60 and 70, controller 28 will utilize simplex T12 as the starting simplex instep 110 when determining the target simplex that contains a target result for the particular pixel to be printed. Once controller 28 has identified the target simplex by computationally "walking" through the series or sequence of adjacent simplices, beginning at starting simplex T12, controller 28 once again uses the points of the identified target simplex and their corresponding input values to interpolate and identify the particular combination of device dependent inputs that achieve the device independent target result. This process is repeated for each pixel of image 42 reprinted upon medium 42. However, because controller 28 utilizes the previously formed designated simplex table to identify a starting simplex that is closer to the target simplex, computational power and time may be saved.

Although methods 70, 100 and 300 have been described with respect to identifying device dependent color inputs (such as cyan, magenta and yellow) for achieving a device independent color result (such as a color specified in Lab or xyz color space), in other embodiments, methods 70, 100 and 300 may be applied in other applications. For example, methods 70, 100 and 300 may alternatively be utilized to identify different paint colors specified in a first color space, which when mixed, form a resultant color specified in a second color space. Methods 70, 100 and 300 may also be utilized to identify different color inputs specified in a first color space for a display or monitor, which when mixed, form a resultant display color specified in a second color space. For example, different colors to be displayed by a monitor may be specified in a first color space, wherein the monitor (device dependent) inputs comprise colors in a second color space, such as red, green and blue. Methods 70, 100 and 300 may also be used in applications unrelated to color, wherein two or more inputs, when combined, achieve a result that is nonlinearly related to such inputs. Methods 70, 100 and 300 may be used to identify a target simplex formed by points of sensed results, wherein the points to the target simplex and their corresponding input values are used to interpolate and identify combinations of inputs for a target result that has not been directly sensed.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. A method comprising:
   identifying, with a processor, a target simplex from simplices having points in a device independent space, each point having a corresponding combination of device dependent inputs, the identifying comprising:
   determining, with the processor, whether a test simplex contains a target result in the device independent space, wherein if the test simplex does not contain the target result, selecting another adjacent simplex as the test simplex and repeating the determining until the target simplex is identified; and
   interpolating the device dependent inputs of the points of the target simplex with the processor to identify a combination of device dependent inputs for the target result; and
   applying the combination of device dependent inputs to a device to produce the target result.

2. The method of claim 1, wherein the device independent space comprises a device independent color space and wherein the device dependent inputs comprise color inputs from a printing device.

3. The method of claim 1, wherein the inputs comprise color inputs including cyan, magenta, yellow and black ink inputs.

4. The method of claim 1, wherein at least a portion of the points in the device independent space are non-linearly related to their inputs.

5. The method of claim 1, wherein the determining of whether the test simplex contains the target result comprises determining whether the target result is on a same side of a face or segment of the test simplex as another point of the test simplex.

6. The method of claim 1, wherein an initial test simplex comprises a simplex centrally located within the simplices.

7. The method of claim 1 further comprising:
   storing the target simplex identified for the target result; and
   selecting an initial simplex for testing to determine a second target simplex for a second target result based upon the stored target simplex.

8. The method of claim 7, wherein the selecting of the initial simplex for testing to determine the second target simplex is based upon proximity of the target result to the second target result.

9. The method of claim 8 further comprising:
   partitioning the device independent space into sections, wherein the initial simplex selected for testing is contained in one of the sections also containing the target simplex for the target result.

10. The method of claim 1, wherein the device dependent inputs comprise at least one of print media and imaging material configured to be deposited upon the print media.

11. An apparatus comprising:
    a printing device;
    a controller configured to identify a combination of imaging media inputs to be applied to print media to achieve a target result in a device independent color space by:
    identifying a target simplex from simplices having points in the device independent color space, each point having a corresponding combination of imaging media inputs, the identifying comprising:
    determining whether a test simplex contains the target result, wherein if the test simplex does not contain the target result, selecting another adjacent simplex as the test simplex and repeating the determining until the target simplex is identified; and
    interpolating the imaging media inputs of the points of the target simplex to identify the combination of imaging media inputs that achieve the target result.

12. The apparatus of claim 11, wherein an initial test simplex comprises a simplex centrally located within the simplices.

13. The apparatus of claim 11, wherein the controller is further configured to:
    store the target simplex identified for the target result; and
    select an initial test simplex to determine a second target simplex for a second target result based upon the stored target simplex.

14. The apparatus of claim 13, wherein the controller is configured to select the initial test simplex to determine the second target simplex based upon proximity of the target result to the second target result.

15. The apparatus of claim 14 , wherein the controller is further configured to partition the device independent color space into sections, wherein the initial test simplex is contained in one of the sections also containing the target simplex for the target result.

* * * * *